(12) United States Patent
Xu et al.

(10) Patent No.: US 8,397,261 B2
(45) Date of Patent: Mar. 12, 2013

(54) USER CLASSIFIABLE SET-TOP BOX

(75) Inventors: Bin Xu, Golden, CO (US); William J. Ivanich, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 365 days.

(21) Appl. No.: 12/343,070

(22) Filed: Dec. 23, 2008

(65) Prior Publication Data

US 2010/0162317 A1 Jun. 24, 2010

(51) Int. Cl.
*H04H 60/33* (2008.01)
*H04N 7/16* (2011.01)

(52) U.S. Cl. ............... 725/46; 725/10; 725/25; 725/50; 725/139; 725/151

(58) Field of Classification Search .................... 725/40, 725/46, 50, 100, 111, 131, 139, 151
See application file for complete search history.

(56) References Cited

U.S. PATENT DOCUMENTS

| | | | |
|---|---|---|---|
| 6,934,964 B1 | 8/2005 | Schaffer et al. | |
| 7,444,658 B1* | 10/2008 | Matz et al. | 725/34 |
| 2001/0013885 A1* | 8/2001 | Yamaguchi et al. | 347/85 |
| 2004/0237112 A1* | 11/2004 | Wasilewski et al. | 725/86 |
| 2006/0184967 A1 | 8/2006 | Maynard et al. | |
| 2007/0143839 A1* | 6/2007 | Chen et al. | 726/17 |
| 2007/0214473 A1 | 9/2007 | Barton et al. | |
| 2007/0277201 A1* | 11/2007 | Wong et al. | 725/40 |
| 2008/0222678 A1* | 9/2008 | Burke et al. | 725/44 |
| 2009/0150922 A1* | 6/2009 | Russ et al. | 725/30 |

OTHER PUBLICATIONS

International Search Report and Written Opinion dated Feb. 25, 2010, PCT/US2009/069256, 7 pages.

* cited by examiner

*Primary Examiner* — Kieu Oanh T Bui
(74) *Attorney, Agent, or Firm* — Ingrassia Fisher & Lorenz, P.C.

(57) ABSTRACT

One embodiment may take the form of an apparatus for providing separate user classifications and interfaces to multiple users of a set-top box of the television system. Each user classification may be configurable to provide different interfaces, menus and available features to the users of the set-top box. Further, each user classification may include several sub-classifications to further personalize the set-top box to the various users of the system. Also, each user classification may also monitor the habits and usage of each class and store such information for use by the set-top box to suggest settings of the set-top box that the user may be interested in, such as a favorite channel list.

14 Claims, 9 Drawing Sheets

USER CLASSIFIABLE SET-TOP BOX

TECHNICAL FIELD

The present invention relates generally to television systems, and more particularly to providing multiple user classifications and interfaces in a set-top box.

BACKGROUND

Many digital cable, satellite or terrestrial television systems transmit an incoming television signal provided by the television provider to a set-top box or other television receiver. The set-top box may receive the encrypted signal and convert it into a signal that the user's television may recognize in order to display it to the user. Further, the set-top box may also provide an interface to and receive inputs from the user of the television system to allow the user to interact with the system.

For example, the user may utilize a remote control to access the set-top box to select a particular channel to view. The user may input the desired channel directly or may select the channel from a on-screen guide. Further, the user may alter the interface presented to provide a different look and options to the user. For example, the user may select certain channels that may be included in a favorite channels list. The on-screen guide may then be altered to only show the channels that are included on the user's favorite channel list, thereby reducing the number of available channels shown on the on-screen guide. Other features of the set-top box may allow the user to purchase pay-per-view programs, record television programs to a digital video recorder, and restrict certain channels from being viewed by children.

Generally, however, the interface presented to the user and the available settings of a set-top box are the same for all users accessing the set-top box. For example, the program guide and available channels of the set-top box may be the same for any viewer, whether the viewer is a child or an adult. Thus, a child may make changes to the settings of the set-top box or view programs unintended for the child. Current set-top boxes attempt to limit the usage of the set-top box by a child by providing password security on certain channels or programs. However, this may require that the parent enter the password every time a particular program or channel is desired. Further, the child may guess the password at any time during viewing to view the restricted content. Thus, what is needed is a set-top box that can retain information on several users and adjust the settings and available options of the set-top box to the current user accordingly.

BRIEF SUMMARY

One implementation may take the form of a method for providing an interface to a user of a set-top box. The method may comprise prompting the user for selection of at least one user classification from a list of a plurality of user classifications, with each user classification associated with a user interface, receiving an input indicating the selection of the at least one user classification and providing the associated user interface of the at least one user classification to the user.

Another implementation may take the form of a system for providing a user interface to a user of a television system. The system may include a first set-top box configured to receive a selection of a first user classification from a plurality of user classifications when the user accesses the first set-top box, wherein the first user classification is associated with a first user interface.

Yet another implementation may take the form a set-top box. The set-top box may include a microprocessor and a computer-readable storage medium. The computer readable storage medium may store a computer-executable code that, when executed by the microprocessor, causes the set-top box to transmit at least one user classification selected from a plurality of user classifications to a display. Further, each user classification may comprise a user interface with available options and settings. The set-top box may also include an I/O interface configured to receive a selection of the at least one user classification.

DETAILED DESCRIPTION

One embodiment may take the form of an apparatus for providing separate user classifications and interfaces to multiple users of a set-top box of the television system. Each user classification may be configurable to provide different interfaces, menus and available features to the users of the set-top box. Further, each user classification may include several sub-classifications to further personalize the set-top box to the various users of the system. In some implementations, the user classifications may be hierarchal, such that a high classification may have a higher level of access to the features of the set-top box, as well as control over the access and available features of the other user classifications.

The set-top box may also monitor the habits and usage of the set-top box when each class is active and store such information for use by the set-top box. For example, the embodiment may monitor and record which television channels and programs are viewed by the user within each user classification. Further, the usage information gathered for each classification may be used by the embodiment to suggest settings of the set-top box in which the user may be interested, such as composing a favorite channel list. In other embodiments, the settings of the user classifications may be automatically adjusted in response to the monitored usage by the user.

Figure 1:
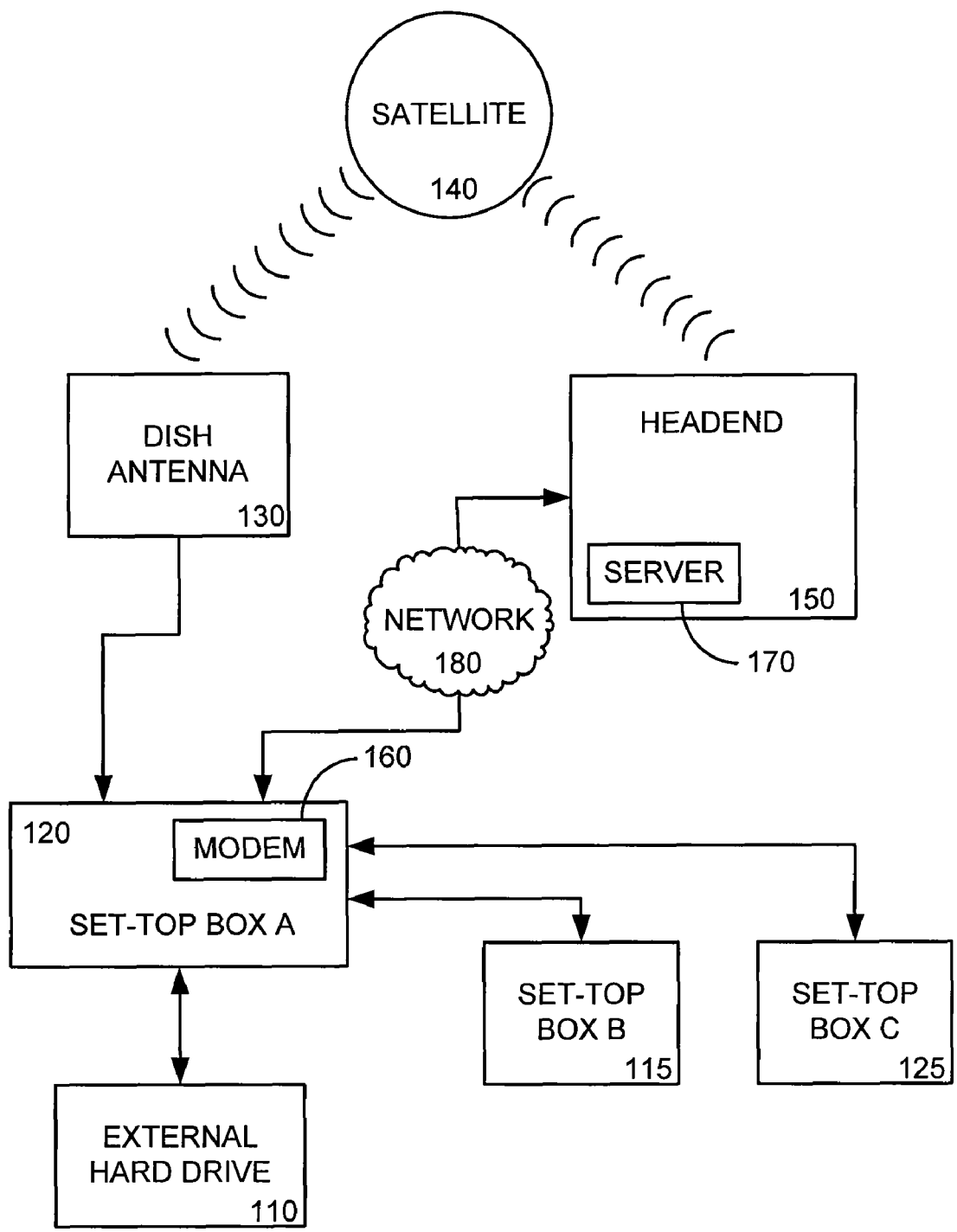
FIG. 1 depicts an exemplary satellite television system that may utilize a first embodiment to provide multiple user classifications for a set-top box.

FIG. 1 depicts an exemplary satellite television system that may utilize a first embodiment to provide multiple user classifications for a set-top box. The satellite system is one example of a system that may provide user classifications for a set-top box. Alternatively, a digital cable satellite system or any other television system may also utilize the embodiments described herein.

The television system of FIG. 1 may include multiple STBs, namely STB A 120, STB B 115 and STB C 125. While only three STBs are shown in FIG. 1, the television system may include any number of STBs. As described above, the STBs of the system may receive an encrypted television signal and convert it into a signal that a user's television may recognize in order to display it to the user. Further, the STBs may provide the converted signal to a display device, such as a television or computer screen, for display to the user. In one implementation, STB A 120 may receive the encrypted signal from a satellite or through a digital cable or network connection. Further, in the satellite and digital cable configurations, the encrypted television signal may be generated by a headed 150 and transmitted to STB A 120. Generally, the headend 150 may be a master facility that receives television signals for processing and distribution to various television systems. In a satellite television provider, the headend 150 may transmit the audio/visual signal to a satellite 140 for redistribution to subscribers. Upon receipt, the satellite 140 may transmit the signal to a dish antenna 130 connected to STB A 120 for decryption.

In a cable television system configuration, the headend 150 may transmit the television signal directly to STB A 120 over a cable network connection. For example, the signal may be provided to STB A 120 through a dedicated cable connected between STB A and the headend 150. Alternatively, the signal may be provided over a network 180 connection, utilizing a modem 160 associated with STB A 120.

In the exemplary system, several STBs are connected to and receive a multimedia content from STB A 120. For example, STB B 115 and STB C 125 may be connected to STB A 120 and may receive the encrypted or decrypted television signal from STB A. STB B 115 and STB C 125 may be further associated with separate televisions such that each STB may provide a different television program to its associated television. For example, STB A 120 may be located in a living room of a home, while STB B 115 and STB C 125 may be located in bedrooms of the home. Thus, several programs may be viewed at the same time through the STBs and the associated televisions.

Each STBs may also include a digital video recorder (DVR) contained within, or otherwise connected to, the STB. A DVR is a device that may record video and/or audio in a digital format to a disk drive or other memory medium within the device. Through the digital recorder, a user may record a television program to a memory medium so that the program may be viewed by the user at a more convenient time. In many cases, the memory medium may be a hard drive device that is external to the STB but configured to receive the digital information of the recorded program. The external hard drive 110 of STB A 120 may be configured to store the recorded programs of the digital video recorder in a convenient device. Further, the external hard drive 110 may be disconnected from the STB A 120 and connected to separate STBs such that the programs may be stored on the hard drive by each STB of the system.

Figure 2:
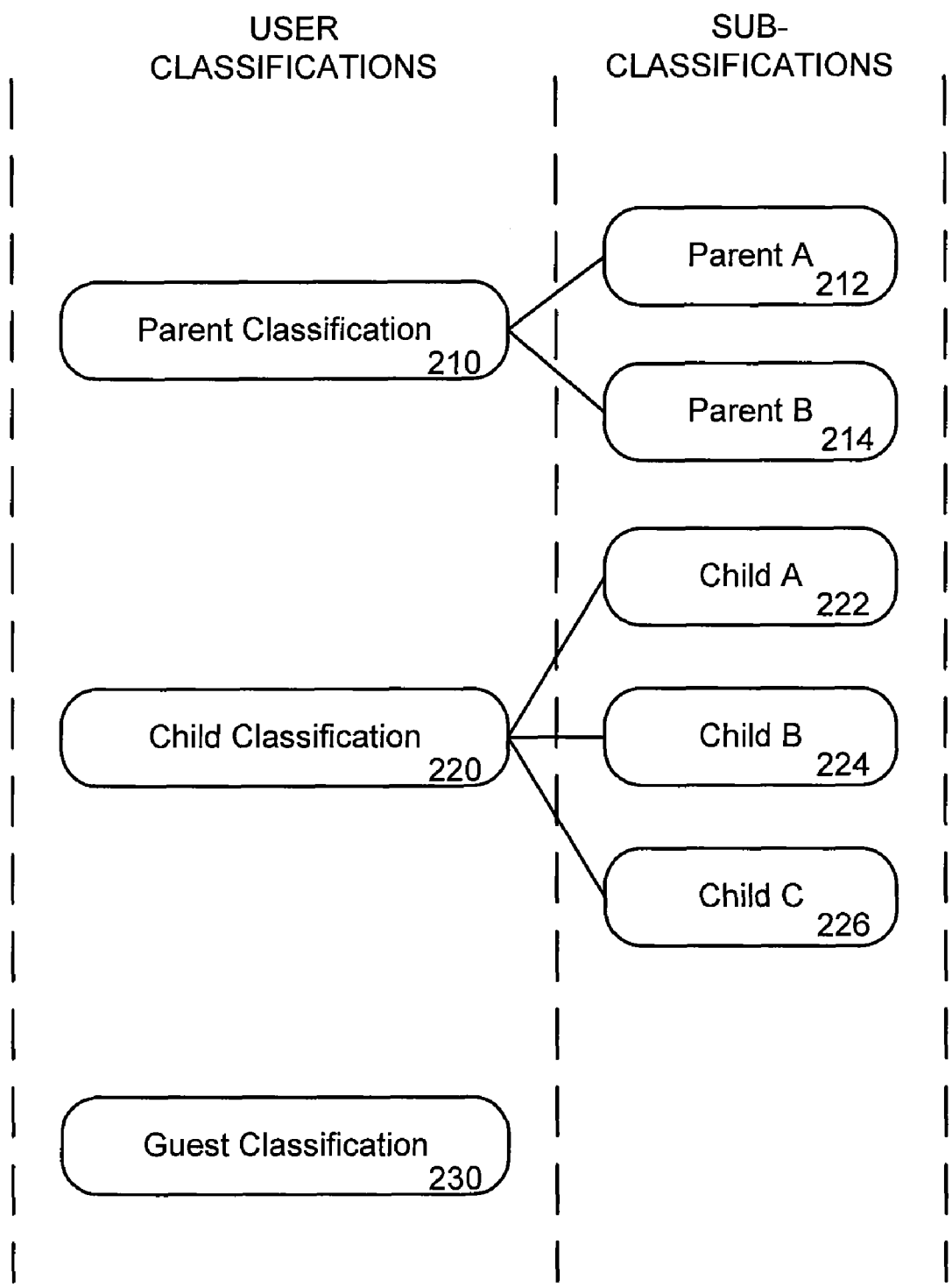
FIG. 2 depicts relationships between various user classifications and sub-classifications within a set-top box.

Each of the STBs described in FIG. 1 may include several user classifications that may be accessible to a user. As explained in more detail below, the classifications may be stored in the memory of the STB and accessed by the user, by utilizing a remote control or other input device, upon start-up of the STB. FIG. 2 depicts various user classifications and sub-classifications within a set-top box. For example, STB A 120 may have three user classifications through which the user may access the television system, namely a parent class 210, a child class 220 and a guest class 230. However, it should be appreciated that there are no limits on the number of user classifications associated with a STB. Further, each classification may have one or more sub-classifications. For example, a parent class 210 may have a sub-class for each parent that may use the STB, such as a parent A 212 sub-class and a parent B 214 sub-class. Similarly, a child class 220 may have a sub-class for each child in the house that may use the STB, such as a child A 222 sub-class, a child B 224 sub-class and a child C 226 sub-class. Any number of sub-classes may be associated with a parent class. Thus, the number of user classifications and sub-classes are limited only by the computing power and/or storage capacity of the STB. Further, the designations assigned to each class and sub-class may be alterable to identify a particular user. For example, the parent A 212 sub-class label may be changed to the first name of one of the parents, as may be the other classes or sub-classes within the STB. Generally, the classes and sub-classes may be labeled using any string of alpha-numeric characters.

The configuration of each user classification may take many forms, thus providing the user with different settings, interfaces, menus, available channels and content. For example, users accessing the STB through a parent classification 210 may have access to all available settings and programs of the STB. Continuing this example, an ultimate user may view any available program regardless of the rating of the program, may order a pay-per-view program and may record any program to the DVR memory or external hard drive 110. Further, the interface presented to the user may include all available menus and settings. Among other things, the ultimate user may have the option to block channels, to adjust the settings of the DVR, to schedule a timer to record a program or a series and to adjust the interface of the STB. Further, as explained below, a user accessing the STB through a parent classification 210 may also configure the settings of the other user classifications of the STB.

In contrast, a user accessing the STB through a child classification 220 may have a more limited access to the channels and settings of the STB. For example, the user may not be able to view programs that have a certain rating, such as programs rated "R" or "TV-M." Similarly, entire channels may be blocked from access by the user, as may be certain programs stored on the DVR or external hard drive 110 based on the program's rating. For example, a rated "R" movie that is stored on the DVR by a first user through the parent classification 210 may not be available to a second user accessing the STB through a child classification 210. In some implementations, the unavailable programs and channels may not be presented to the user at all, thereby preventing the child user from even being aware of the unavailable content.

Other features may be completely blocked from access within the child classification 220 or other sub-classification. For example, a user may not be able to order a pay-per-view program through the child classification 220 or may not have access to special features, such as interactive TV or an embedded web browser. Similar to the above, these options may not be presented to the user of the child class at all. Other features may be available to the user, but in a more limited manner. For example, a time limit may be set to limit the amount of time that a user may access the STB through the child classification 220. Thus, a parent may establish a time limit that a child may watch television, after which the STB may no longer allow a user to access that user classification until a certain amount of time passes. In another implementation, the set-top box may time the usage of the television within a classification over a particular amount of time, such as within a single day. Thus, the amount of time may accrue as the television is watched through a particular classification and may limit the number of hours that accrue within in a set amount of time. For example, the STB may limit a classification to six hours of television per day, or one hour for every six hours.

The guest classification 230 may have a similar or a more limited access than that of the child classification 220. For example, the guest class 230 may only have access to certain channels and programs, with no access to the DVR programs or the settings of the STB. Generally, however, the access to the options of the STB of any classification may be configured in any manner, such that the classifications may have universal access, access to no settings or options at all, or anything in between.

Figure 3:
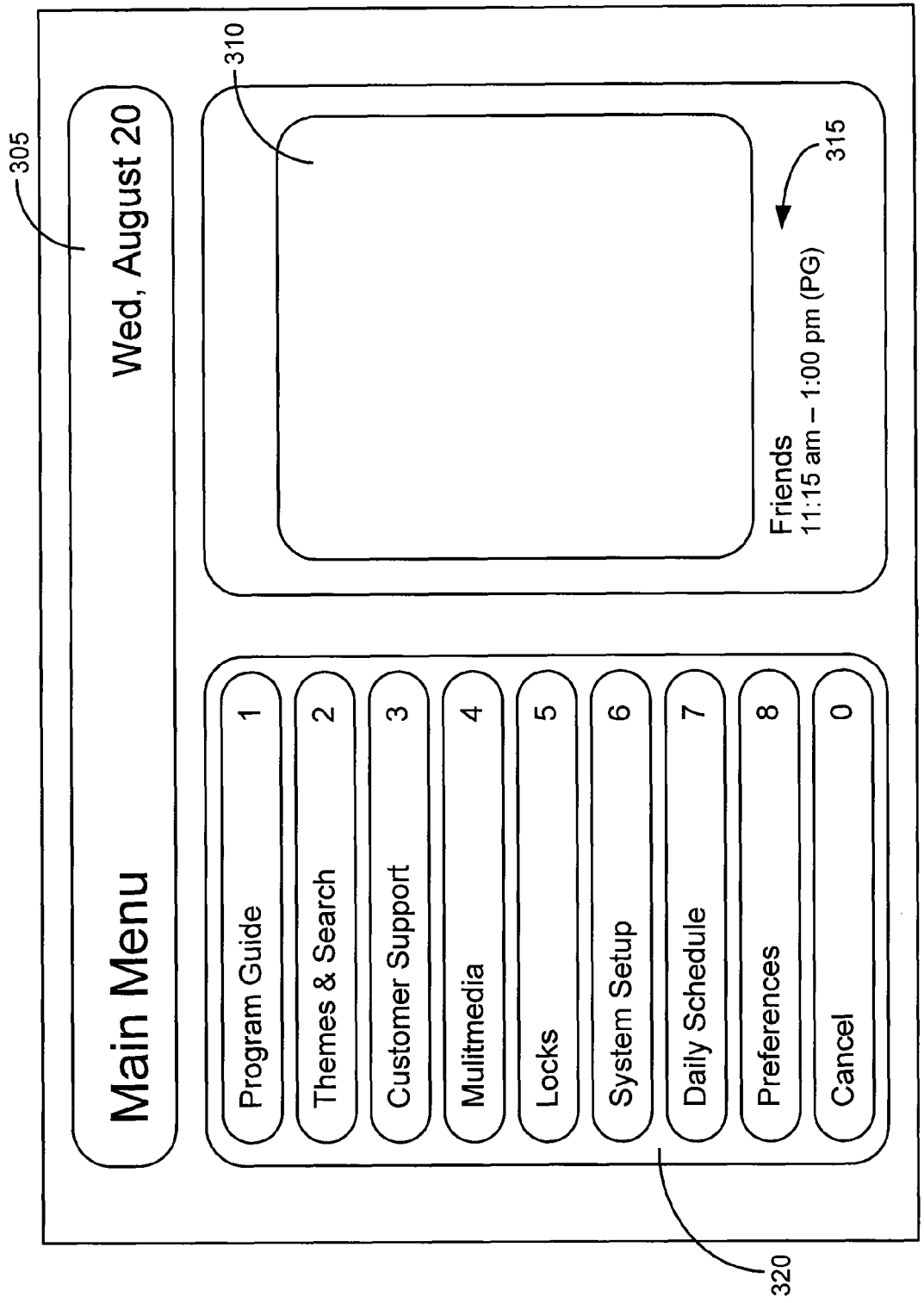
FIG. 3 is an exemplary menu interface for a parent user classification of a set-top box.

In one implementation, each user classification may have a different interface, or different interface elements, that the user may interact with. FIG. 3 is an exemplary menu interface for a parent user classification of a set-top box. The menu interface may include a title bar 305, including a title for the interface and a date. The menu interface may also include a viewing panel 310 displaying a currently airing television program, as well as information 315 about the currently airing program.

The interface menu may also present a list of available options and settings 320 to the user, as well as an indication as to which button on the remote control or other input device may be pressed to access each option. For example, if the user wishes to lock a channel or program from being viewed by a child or other viewer, he may press "5" on the remote control to access the "Locks" menu. The selection of the "Locks" menu may cause a separate menu to appear to guide the user through the operations of establishing a lock on a channel or program. In a similar manner, the user may access any menu shown in the list of available options and settings 320. Generally, the interface presented to the user in a may include any number of menus and settings options.

A user accessing the STB through the parent classification may be presented with an interface that presents the user with several menus and options, such as shown in FIG. 3. For example, the user may access a locks menu to set locks on a particular channel or program, a system setup menu to configure the STB and a customer support menu to access a help menu in troubleshooting the STB. Further, the interface presented to the parent user may include all of the options and settings of the STB such that the parent user may have access to all settings to configure the system. By contrast, users accessing the STB through a lower-level classification, such as a child class or guest class, may be presented with a more limited interface, including fewer or no menu selections or options.

Figure 4:
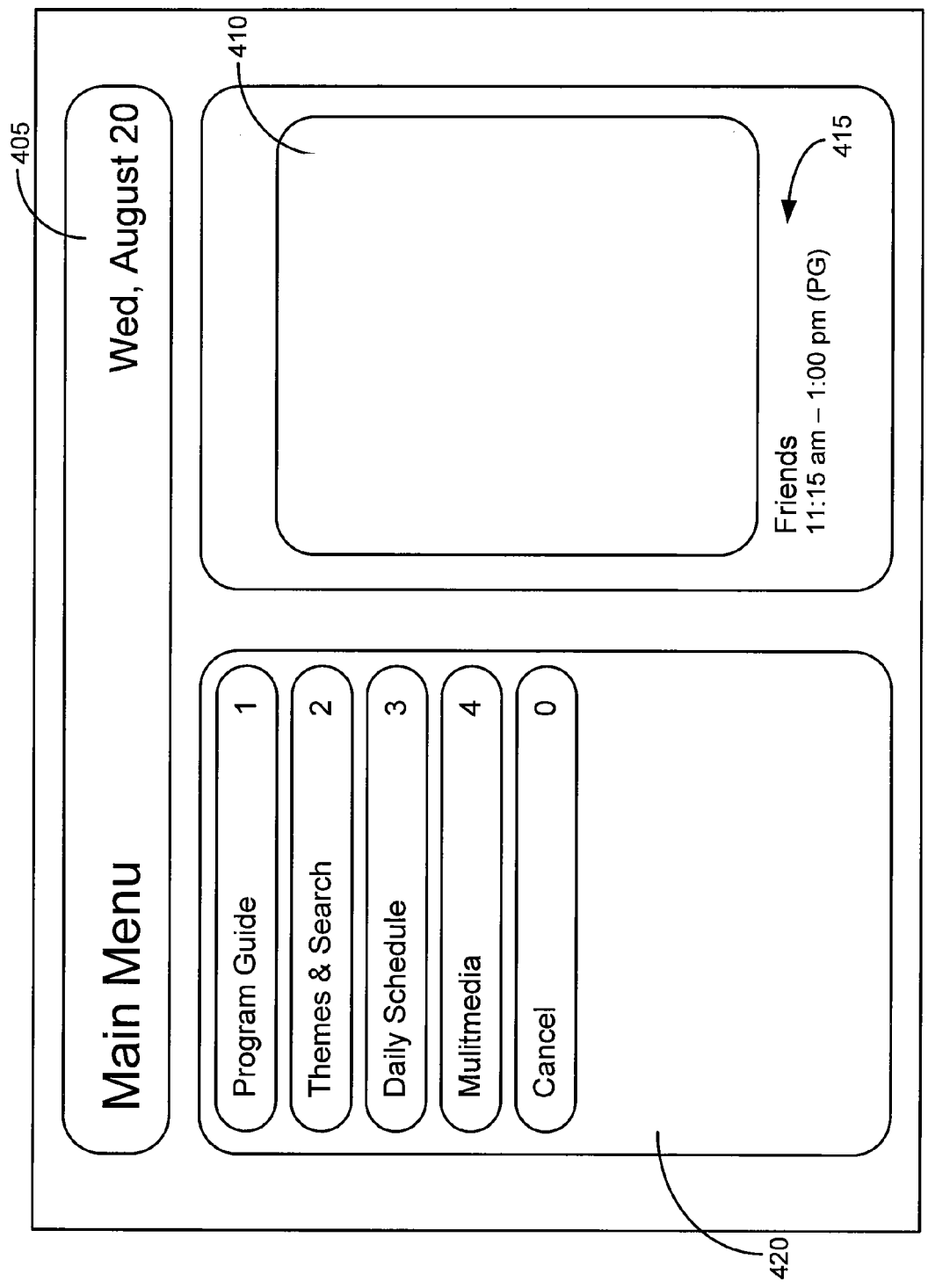
FIG. 4 is a second view of the exemplary menu interface for a child user classification of a set-top box.

FIG. 4 is an exemplary menu interface for a child user classification of a set-top box. Similar to the interface menu of FIG. 3, this interface may also include a title bar 405 including a title for the interface and a date, a viewing panel 410 displaying a currently airing television program and information 415 about the currently airing program.

The interface menu of FIG. 4 may also include a list of available options and settings 420. However, the list of available options and settings 420 presented to a user accessing the STB through a child classification may include fewer options than those presented to a parent user. For example, the child interface may not permit a user to set locks on the channels or programs of the STB, configure the STB through the system setup menu, or change the preferences of the STB through the preferences menu. Instead, the list of available options and settings 420 may be limited to those menus and options that allow the user to view some television programs, such as a program guide, a daily schedule menu and a search function. Thus, a user accessing the STB through a child or guest classification may not be presented with the option of configuring or changing at least some settings of the STB. Generally, the user classifications of the STB may be configured to include any number of available options or settings, as well as access thereto.

Each user classification may also provide different configurations or styles to the users. For example, users of a child classification may be presented with an interface that includes easier to understand menus, including larger typeface for easier reading, simpler words and so forth. Also, the different interfaces of the separate classifications provided to the users may be tailored to the likes and dislikes of the users. For example, a user may select a wallpaper design for their particular interface, perhaps including themes around the user's favorite sports team, celebrity or content providing by the satellite broadcaster. Users accessing the child classification may select a wallpaper design with themes of a favorite cartoon character. Generally, the interfaces of each user classification may be tailored in any manner to provide different options to the user and different looks of the interface to the viewer.

Further, each user classification may be configurable to add or remove available options by a user accessing the STB through a parent classification. For example, the user classifications may be hierarchal in nature, with the parent class at the top and the guest class at the bottom. A user accessing the STB through the parent classification may then configure the options and settings available for all the other classes. Thus, the user of a parent class may limit the channels available, the programs available to view and other available options of the child and guest classifications. For example, the parent user may select which channels and programs are to be blocked in the child user classification, as well as setting a time limit for viewing the television for the child classification. Further, the parent user may configure the design of each classification, including the wallpaper theme and menu typeface. In a similar manner, the parent user may also set up the options for the guest classification or any other classification lower on the hierarchy. In general, an ultimate user accessing the STB through the highest classification may configure each of the other classes to provide the different configurations and options described above.

However, it should be appreciated that the configurable nature of the user classifications may be limited to the presentation and availability of multimedia content provided by the television system only. Other options associated with the STB may not be configurable through the highest classification, such as software updates on the operating system of the STB, hardware updates or management of the STB or network management, among other options. For example, the ultimate user may utilize a user classification to configure the available channels of a particular interface, but may not configure the hardware installation of the STB.

In addition to configuring the options of each class within a single STB, the user classifications of multiple STBs may also be configured from one STB of the group. For example, STB A 120 of FIG. 1 may be accessed through a parent classification, giving the user the option to configure the other classifications of STB A 120. However, the ultimate user may also utilize an option of the ultimate classification (which may be the parent class) to also configure the classifications of STB B 115 and STB C 125 in a similar manner as described above. Further, the ultimate user may dedicate an STB to a specific class such that only one user classification may be accessed at that STB. For example, STB B 115 may be located in the bedroom of the child of a user of the system. A parent may desire to prevent the child from accessing any other classification and may lock STB B 115 into a child classification. Thus, any user accessing STB B 115 may only access it through the child classification. Similarly, STB C may also be locked to a child class or guest class. Generally, the configuration of the user classifications for each STB may be performed in the same manner as described above for configuration of the classes within a single STB.

Figure 5A:
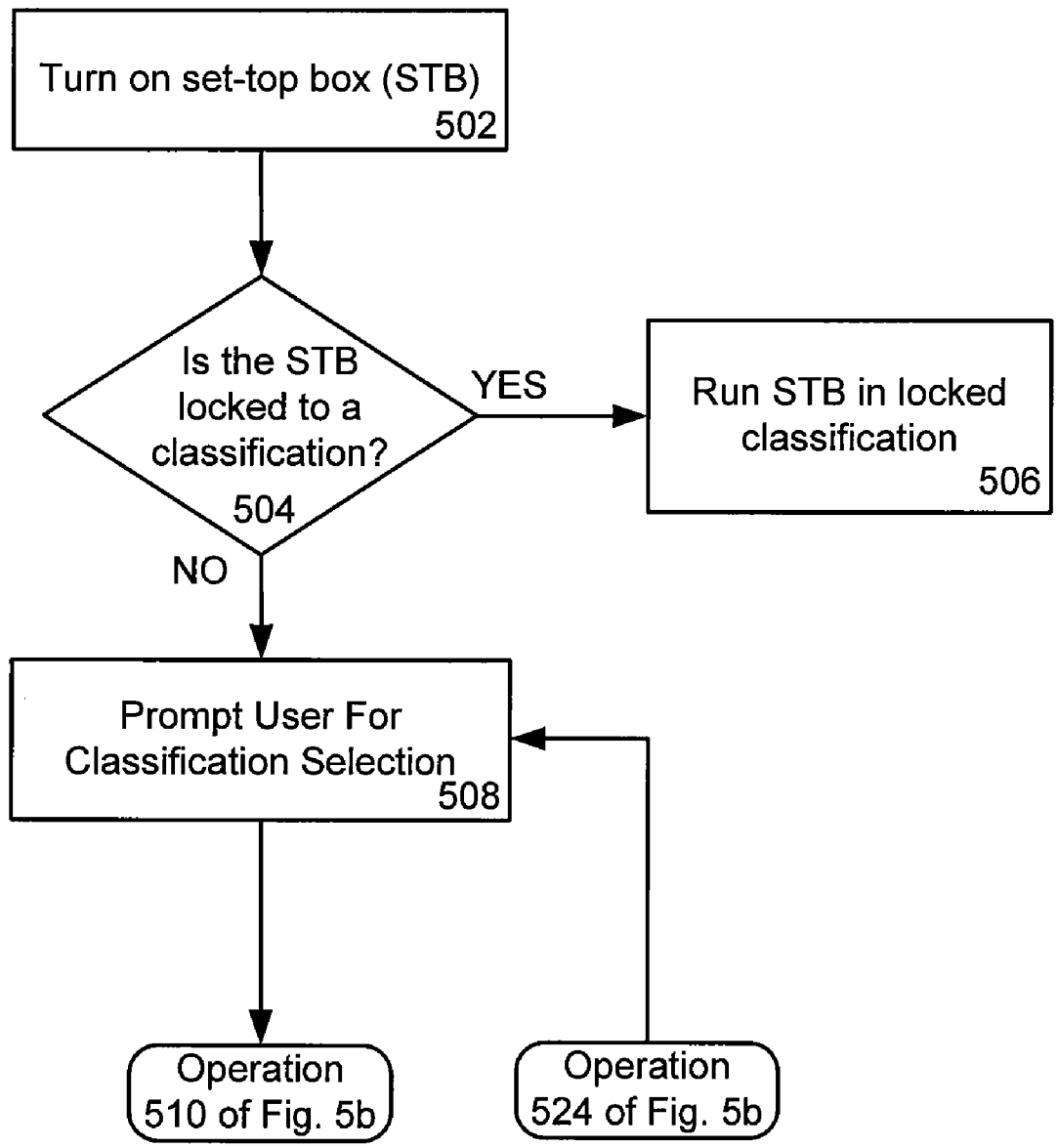
FIG. 5*a* is a flow chart depicting a method for a set-top box to provide a selection menu to a user to select a user classification.
Figure 5B:
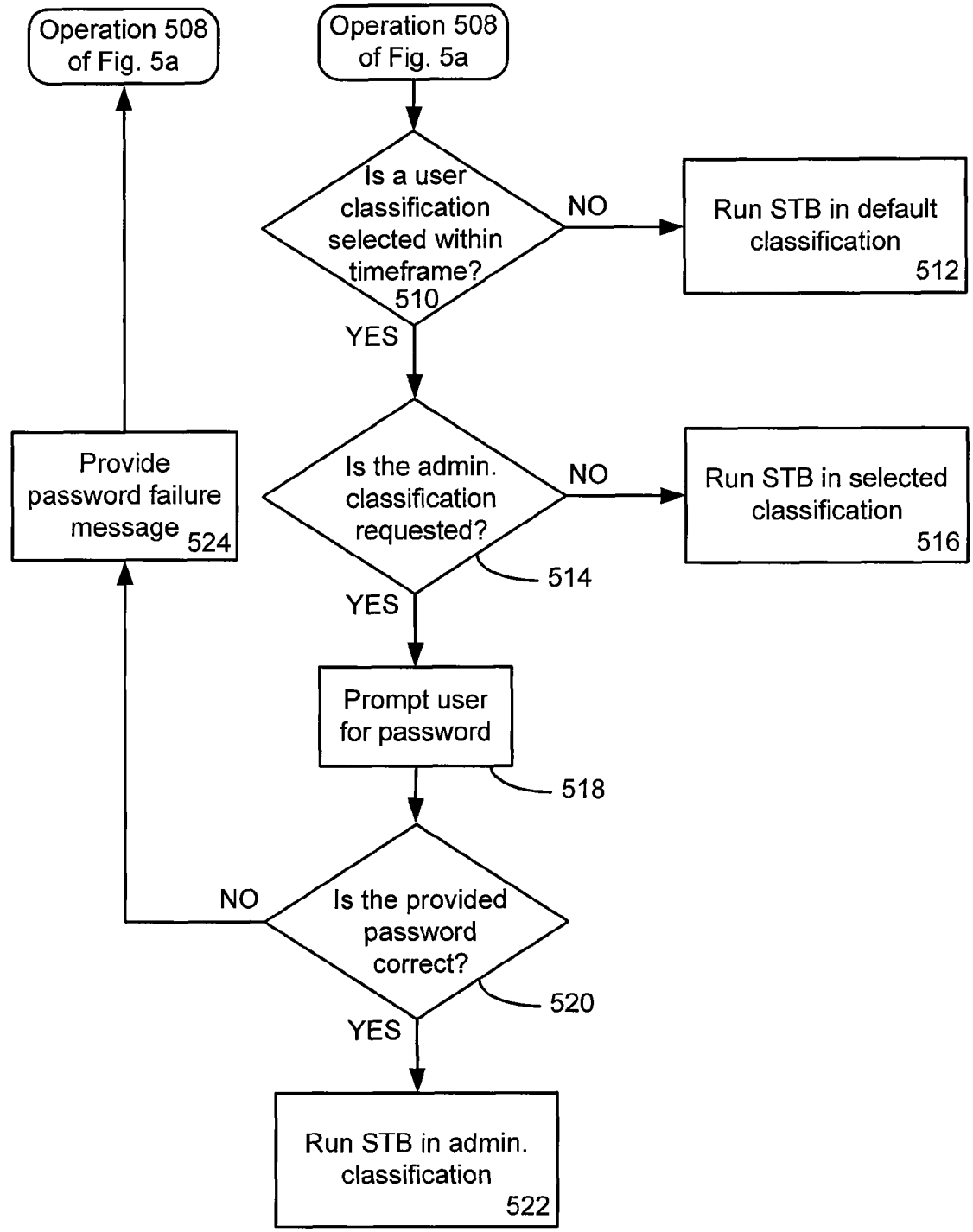
FIG. 5*b* is a flow chart depicting a method for a set-top box to provide a user classification to a user in response to a selection by the user.

FIGS. 5a and 5b depict one embodiment of a method for a user to select a classification through which the user may access the STB. Generally, the embodiment may provide a menu of user classifications to the viewer from which the viewer may select the classification that may best suit the user's needs. FIG. 5a depicts a flowchart for a method that dedicates an STB to a particular user classification while FIG. 5b depicts a flowchart of a method that allows the user to select which user classification is accessed.

The embodiment may begin operation 502 when the STB is turned on or powered up. However, it is not required that the embodiment begin only on start-up or on each start-up of the STB. For example, the user may select to switch from a first user classification to a second classification during operation of the STB without turning off the STB. Thus, the operations may begin when the user switches from one classification to another.

Upon startup, the STB may determine if the STB is locked to a particular user classification in operation 504. As explained above, an STB may be locked to a particular classification to prevent a user from switching to another class. Thus, a parent may lock an STB in a child's room to a child classification. If the STB is locked to a particular classification, the STB may provide the locked classification interface to the viewer and operate in the locked user classification in operation 506.

If the STB is not locked to a particular classification, the STB may then prompt the user for a classification selection in operation 508. The prompt may include each available user classification for that STB. As described above, an STB may have several user classifications, each with possible sub-classifications. The prompt provided to the user may include each classification and each related sub-classification for selection by the user. Alternatively, the available classifications may be limited to those allowed by an ultimate user. Upon providing the prompt to the user, the embodiment may proceed to operation 510 of FIG. 5b.

In operation 510 of FIG. 5b, the STB may wait for a user classification selection from the user for a specified amount of time. The selection of a classification may be received from the user through a remote control or through input buttons on the STB. Further, the STB may be configured to wait for a classification selection for any amount of time. For example, the STB may wait for a user classification selection from the user until the STB has downloaded the program information and is ready to present an interface to the user. In another embodiment, the STB may wait for a selection for a specific amount of time, such as 30 seconds. If a user classification selection is not made before the time limit has expired, the STB may provide a default classification interface to the viewer and begin operating in the default user classification in operation 512. The default classification may be any of the available user classifications. Further, the STB may be configured to automatically select a certain available classification as the default user classification. For example, the STB may be configured to provide a guest classification as the default classification when a selection is not received before the time limit expires.

If a user classification selection is received from the user, the STB may then determine if a classification was selected that provides the user with administrative options in operation 514. For example, as described above, some user classifications may allow the user to configure the other classifications. In the example above, the parent classification allows the user to configure the available options of the other classifications, as well as locking STBs to a particular classification. However, only certain user classifications may have this feature. Thus, if the classification selected in operation 510 does not provide the user with administrative options, then the STB may provide the selected classification interface to the viewer and operate in the selected user classification in operation 516.

If the user selects a user classification with administrative options, then the STB may prompt the user for a password in operation 518. The password protection of the administrative classifications may prevent a user without access to certain content from accessing that content. For example, the password may prevent a child from accessing the parent user classification to view restricted content. Further, the password may prevent a guest user from altering the settings of the STB. The user may provide the password to the STB using a remote control or through push-buttons located on the STB.

In operation 520, the STB may determine if the provided password is correct. If the password is entered correctly, the STB may provide the selected classification interface with administrative options to the viewer and operate in the selected user classification in operation 522. If the password is not entered properly, the STB may provide the user with an on-screen message indicating that the entered password was incorrect in operation 524 and may return to operation 508 of FIG. 5a and again prompt the user to select the desired user classification.

Figure 6:
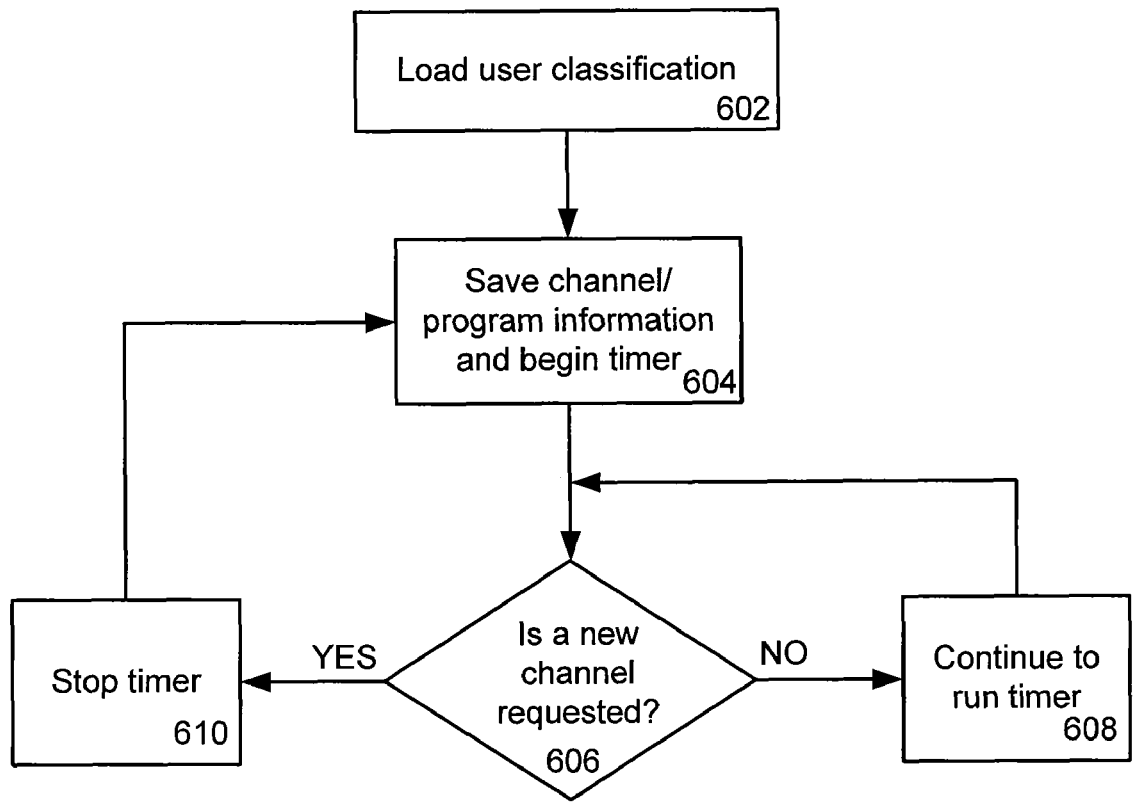
FIG. 6 is a flow chart depicting a method for a set-top box to monitor the television usage of a user.
Figure 7:
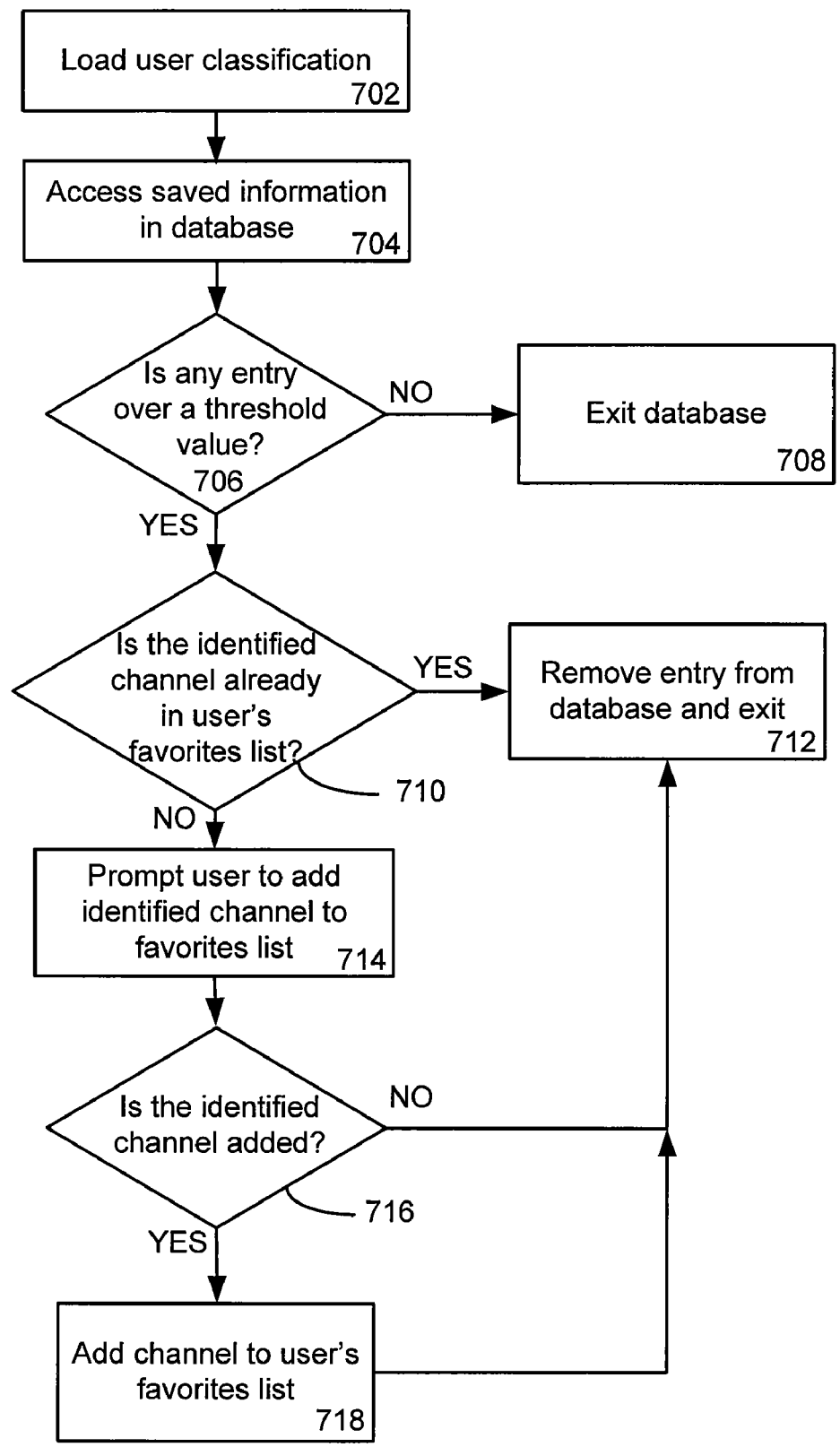
FIG. 7 is a flow chart depicting a method for a set-top box to include a channel in a user's favorite channel list in response to a monitored usage of the channel by the user.

In addition to providing separate user classifications to a user, the STB may also monitor and record which television channels and programs are viewed by the user within each user classification and, based on the gathered information, suggest to the user channels or programs that may match the interests of the user. FIGS. 6 and 7, described in more detail below, provide one embodiment of an STB that may monitor a user's viewing habits within a user classification and provide viewing suggestions to the user based on the gathered information.

FIG. 6 is a flowchart showing a method for a set-top box to monitor the television usage of a user. The operations of the method may be performed when a user accesses an STB through any of the available user classifications, such that the information gathered by the STB may be specific to a particular user classification or user.

The embodiment may begin in operation 602 when a user classification is selected by the user and loaded into the STB in a manner similar to that described above. Once the user classification is loaded into the STB, the embodiment may begin to monitor the viewing habits of the user in operation 604. Although discussed below with reference to the user's viewing habits, it should be appreciated that the method may also monitor the programs that the user records to a DVR or those programs for which the user sets a reminder. Generally, any act performed by the user that may indicate that the user may have an interest in a program or channel may be used by the embodiment.

The STB may monitor the user's habits by storing information about the channels and programs that the viewer chooses to view or record. Thus, for every channel or program selected by the user, an entry may be created in memory or other storage that identifies the current user (based on the selected user classification), associates the program or channel with the user and optionally records a length of time the channel or program is viewed or recorded. For example, the STB may monitor the channels that a user accesses while watching television. For each channel accessed, an entry may be created associating the channel that the user is viewing with the user. Further, each entry may be stored in a memory medium. Thus, if the user views channel two of the television system, an entry indicating such may be stored in memory. Similarly, the STB may identify particular programs airing on the channel that the user may be viewing. Thus, if the user is watching a sporting event, the STB may create an entry indicating that user's interest in the particular sporting event and store the entry in a memory location. A memory location may be any computer-readable medium that may store digital data, as explained in more detail below. Further, other implementations may not create an entry if the program or channel is viewed for a minimal amount of time, to prevent several entries if a user is rapidly flipping through the available channels.

Each entry created for a user may be stored in several memory locations. In one embodiment, the entries may be stored within the memory of the STB. Alternatively, the entries may be stored in memory external to that of the STB, such as an external hard drive or on a server of a network. In the server configuration, the entries may be transmitted from the STB to the server over a network connection as described above with reference to FIG. 1. The server may be located within the described network or may be located at the head-end of the television system. Generally, any memory device that may store the created entries may be used with the described embodiments.

In addition, either the STB or the storage medium may determine if an entry for a particular channel or program already exists in memory before a new entry is created or stored in the memory. For example, the user may access channel two of the television system. During creation of the entry, the STB or storage device may scan the stored entries associated with that particular user. If an entry for channel two already exists within the stored entries, the embodiment may ignore the current entry or may add to the stored entry to indicate that the user has accessed the channel or program again. A similar scan may be performed for each program entry that is stored in memory, as well. If an entry already exists in memory for the accessed channel or program, one implementation may flag or update the entry to indicate that the user has accessed the channel or program twice. This flag may be incremented each time the user of a user classification accesses a particular channel or program.

Further, the STB may also track the amount of time that the user spends on each channel or program. Thus, for each entry stored in memory, an amount of time may be associated with that channel or program. Thus, if a user views a program or accesses a channel for five minutes, the embodiment may store a value indicating the five minute interval that the program or channel was viewed by the user. Returning to FIG. 6, to record the viewing time of the user for a particular program or channel, a timer may begin tracking the viewing time in operation 604 when the user first accesses the channel or program. In the situation where an entry of a channel or program already exists in memory, the time viewed entry may be incremented accordingly.

In operation 606, the STB may wait for an input from the user indicating that the user requests a new channel or program. As long as a new channel is not requested by the user, the STB may continue to track the amount of time that the user has accessed the particular channel or program in operation 608 while continuing to monitor for a channel change. If a new channel is requested by the user, the timer for the previous channel may be stopped in operation 610 and a new entry may be created for the new, requested channel.

The entries stored in memory that represent the channels and programs viewed by a user through a user classification may be utilized to offer a suggestion to the user of particular programs or channels that may be of interest to the user. For example, if the stored entries indicate that the user may be interested in certain sporting events, the user may be made aware of future sporting events that may be of interest to him. FIG. 7 depicts a flowchart for a set-top box to include a channel in a user's favorite channel list in response to a monitored usage of the channel by the user in a user classification.

The method may begin in operation 702 when a user classification is loaded into an STB in a similar manner as described above. Once a user classification is identified or selected by the user, the STB may access a database in which are stored the entries of the user's viewing habits in operation 704. As explained above, the memory medium including the created entries may be an internal memory of the STB or may be external to the STB, such as a server on a network. Thus, the STB may either access the internal memory of the STB or may access an external memory to retrieve the stored entries associated with that particular user classification.

In operation 706, the STB may determine if any of the stored entries have exceeded a pre-set threshold limit. The threshold value for each entry in memory may vary depending on the implementation of the method. For example, one implementation may utilize the number of times that a user accesses a particular channel or program, such as 20 accesses, as the threshold value. Another threshold value may be the amount of time that a particular channel or program is viewed, such as ten hours. Generally, any threshold value that indicates that a user may be particularly interested in a subject matter or channel may be used with the embodiments described herein.

If no entry in the stored entries has achieved the threshold value, the STB may exit the database in operation 708. However, if an entry is over the threshold value, this may indicate that the user may be interested in adding a particular channel or program to the user's favorites list. Thus, in operation 710, the STB may determine if the identified channel or program is already contained within the user's favorites list.

If the STB determines that the identified channel or program is already contained within the user's favorites list, the STB may then remove the stored entry that is over the threshold limit from the database in operation 712. Further, the STB may then exit the database. If the identified channel or program is not already contained within the user's favorites list, then the STB may prompt the user to determine if the user wishes to add the identified channel or program to the user's favorites list in operation 714.

If an input is provided by the user in operation 716 that indicates that the user does not want to add the identified program or channel, then the STB may remove the stored entry that has exceeded the threshold limit in operation 712. Otherwise, the identified channel or program may be added to the user classification favorites list in operation 718. Once the new favorite channel or program is added to the list, the STB may then remove the stored entry that is over the threshold limit in operation 712.

In other implementations, operations 714 and 716 may be removed such that an identified program or channel may be added to the user's favorites list automatically. Thus, once an entry stored in memory has exceeded the pre-set threshold value, the identified channel or program may be added to the list without prompting the user for an input. Instead, operation 718 may be performed if it is determined that the identified favorite is not already included in the user's favorites list. In this manner, programs or channels that may be of interest to the user based on the user's classification may be automatically added into the user's favorites list.

Figure 8:
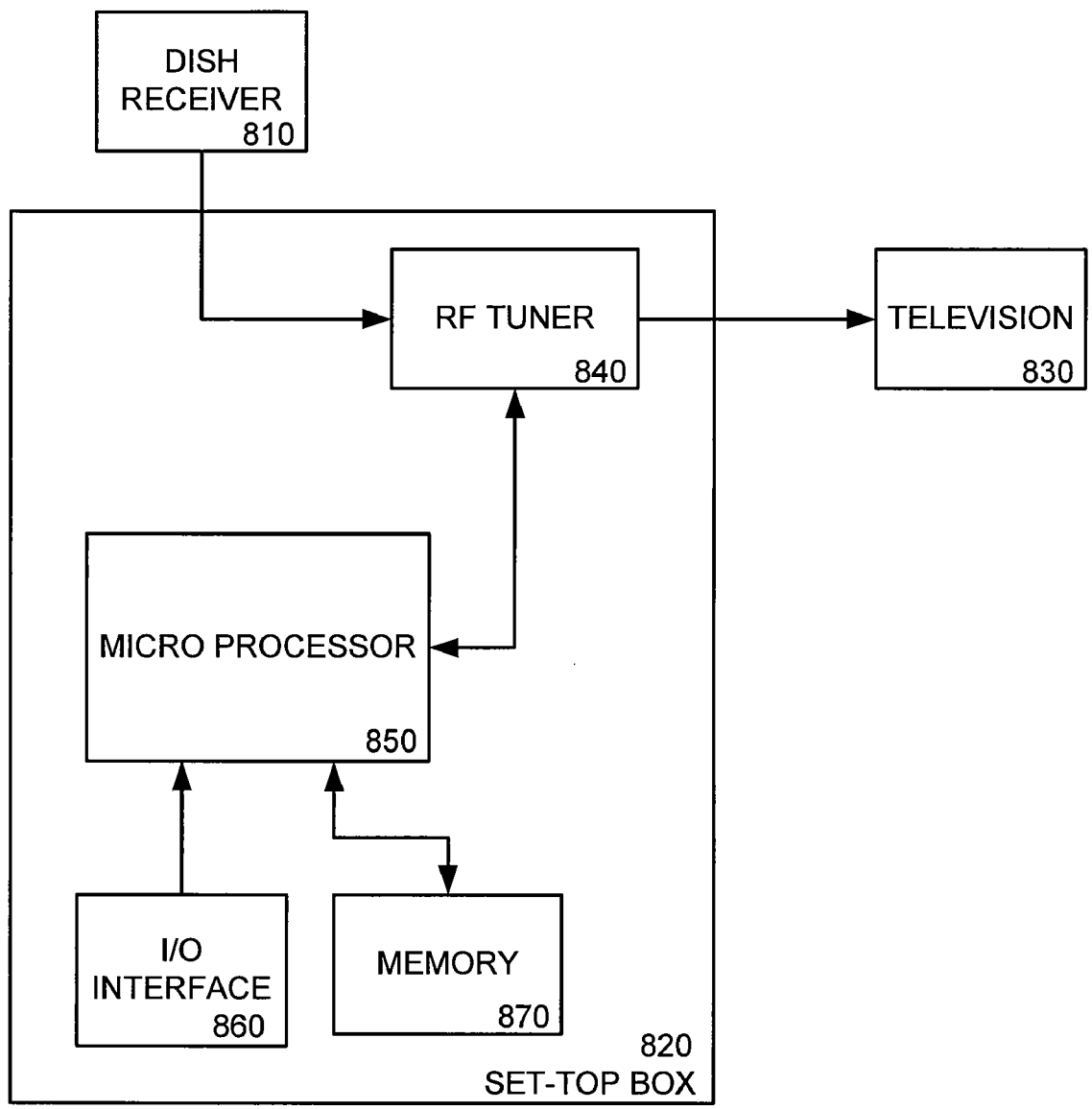
FIG. 8 is a block diagram illustrating an example of a set-top box which may be used in implementing embodiments described herein.

FIG. 8 is a block diagram illustrating an example of a set-top box 820 which may be used in implementing embodiments described herein. The set-top box 820 may receive a transmitted television signal from a satellite dish receiver 810 and may transmit a translated signal to a user's television 830 for display to the user. The television signal may be received at the set-top box 820 by a radio frequency (RF) tuner 840. The RF tuner 840 may translate the received signal and provide that signal to the user's television 830. Although not shown, the satellite dish receiver 810 may include a low noise block (LNB) or other components to decrypt and transmit the received television signal. Similarly, the set-top box 820 may include more or fewer components as those shown Further, the set-top box 820 may provide an interface to the user, through the user's television 830, including one or more user classifications as described above. To provide the interface to the user, the set-top box 820 may include a microprocessor 850 coupled to memory 870, as described in more detail below. The set-top box may also include an input/output (I/O) interface 860 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 850. The I/O device may be utilized by a user to provide inputs and commands to the set-top box 820 to control the interface.

System 800 may include a dynamic storage device, referred to as memory 870, or a random access memory (RAM) or other devices coupled to the set-top box 820 for storing information and instructions to be executed by the microprocessor 850. Memory 870 also may be used for storing temporary variables or other intermediate information during execution of instructions by the microprocessor 850.

According to one embodiment, the above techniques may be performed by a set-top box 820 in response to microprocessor 850 executing one or more sequences of one or more instructions contained in memory 870. These instructions may be read into memory 870 from another machine-readable medium, such as a storage device. Execution of the sequences of instructions contained in memory 870 may cause the microprocessor 850 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 870. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIGS. 5a-7 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for providing an interface to a user of a set-top box, the method comprising:
    at a first set-top box, prompting the user for selection of at least one user classification from a list of a plurality of user classifications, each user classification associated with a user interface;
    at the first set-top box, receiving an input indicating the selection of a first user classification;
    at the first set-top box, providing the associated user interface of the first user classification to the user; and
    at the first set-top box, receiving a command to modify one or more settings of a second user classification, the second user classification associated with a second set-top box located remotely form the first set-top box, the second user classification not associated with the first set-top box;
    wherein the first user classification of the plurality of user classifications controls a set of features available to the second classification of the plurality of user classifications.

2. The method of claim 1, further comprising:
    restricting the second user classification to at least one option available to the user.

3. The method of claim 1, further comprising:
    restricting, to the second user classification, access to multimedia content based on a rating of the multimedia content.

4. The method of claim 1, further comprising:
    prompting the user for selection of at least one sub-classification associated with the second user classification; and
    receiving a selection input indicating the selection of the at least one sub-classification.

5. The method of claim 1 wherein the second user classification is configurable to limit the amount of time that the set-top box is accessed.

6. The method of claim 1, further comprising:
    monitoring the channels accessed by the user through the user interface of the second user classification;
    creating an entry for at least one accessed channel; and
    storing the at least one entry in a memory device.

7. The method of claim 6 further comprising:
analyzing the at least one entry; and
prompting the user to add the channel stored in the at least one entry to a favorite channels list.

8. The method of claim 7, wherein the analyzing operation further comprises:
in the event that the at least one entry has not exceeded a pre-defined threshold value, exiting the memory device; and
in the event that the at least one entry has exceeded the pre-defined threshold value;
removing the entry if the channel stored if the at least one entry is already included in the user's favorite channel's list.

9. The method of claim 1 wherein the background and menus of the user interface of the second user classification relate to a theme.

10. A system for providing a user interface to a user of a television system comprising:
a first set-top box configured to receive a selection of a first user classification from a plurality of user classifications when the user accesses the first set-top box, wherein the first user classification is associated with a first user interface;
a second set-top box associated with and located remotely from the first set-top box, wherein the second set-top box is associated with a second user classification and is not associated with the first user classification, and wherein the second user classification is associated with a second user interface; and
a recording device coupled to the first set-top box, the recording device having a respective set of settings available to each of the respective plurality of user classifications,
wherein the first user classification adjusts the respective set of settings available to the second user classification of the plurality of user classifications, and
wherein the second user classification is configured by the user through the first user interface associated with the first set-top box.

11. The system of claim 10 wherein the second set-top box is locked to the second user interface.

12. The system of claim 10 further comprising:
a modem associated with the first set-top box; and
a server associated with the modem, wherein an entry indicating a channel accessed by the user is stored on the server.

13. The system of claim 12 further comprising:
a headend, wherein the server is located at the headed such that an entry indicating a channel accessed by the user is stored on the server.

14. The system of claim 10 further comprising:
an external hard drive associated with the first set-top box wherein the recording device comprises the external hard drive.

* * * * *